Feb. 21, 1967 N. HOROWITZ ETAL 3,304,609
DENTAL EQUIPMENT STAND
Filed Feb. 16, 1966 5 Sheets-Sheet 1

INVENTORS
NORMAN HOROWITZ
PHILIP SPIGNER
BY
ATTORNEY

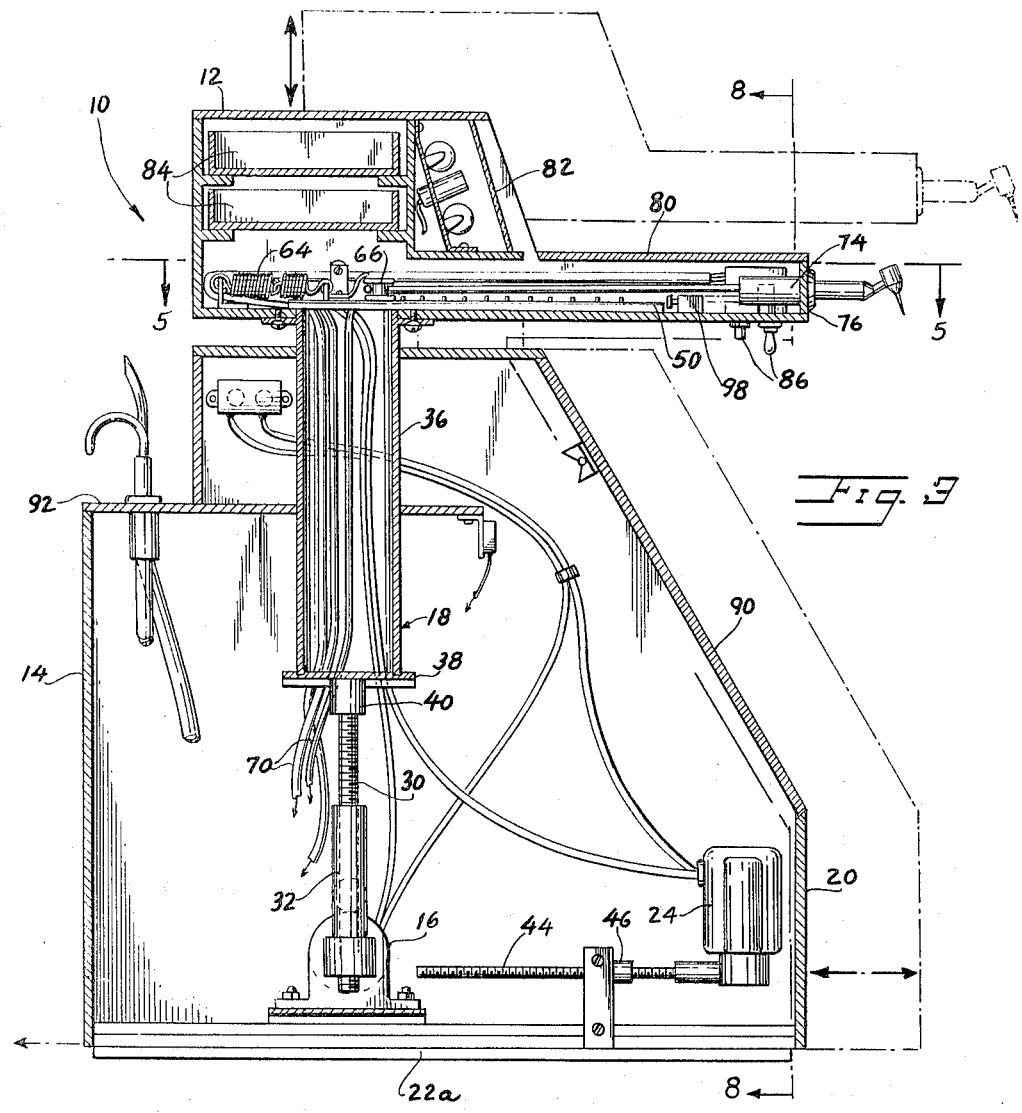
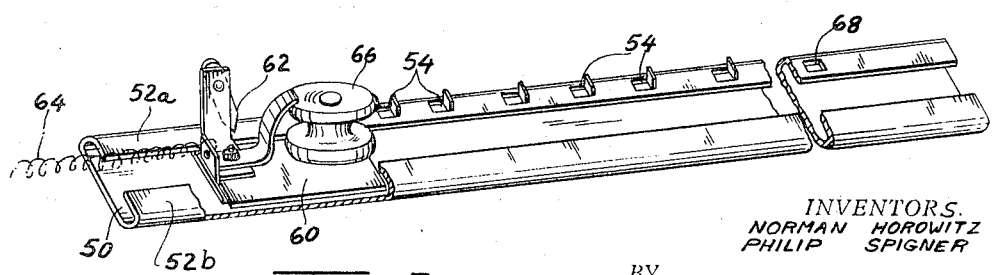

Feb. 21, 1967 N. HOROWITZ ETAL 3,304,609
DENTAL EQUIPMENT STAND
Filed Feb. 16, 1966 5 Sheets-Sheet 3
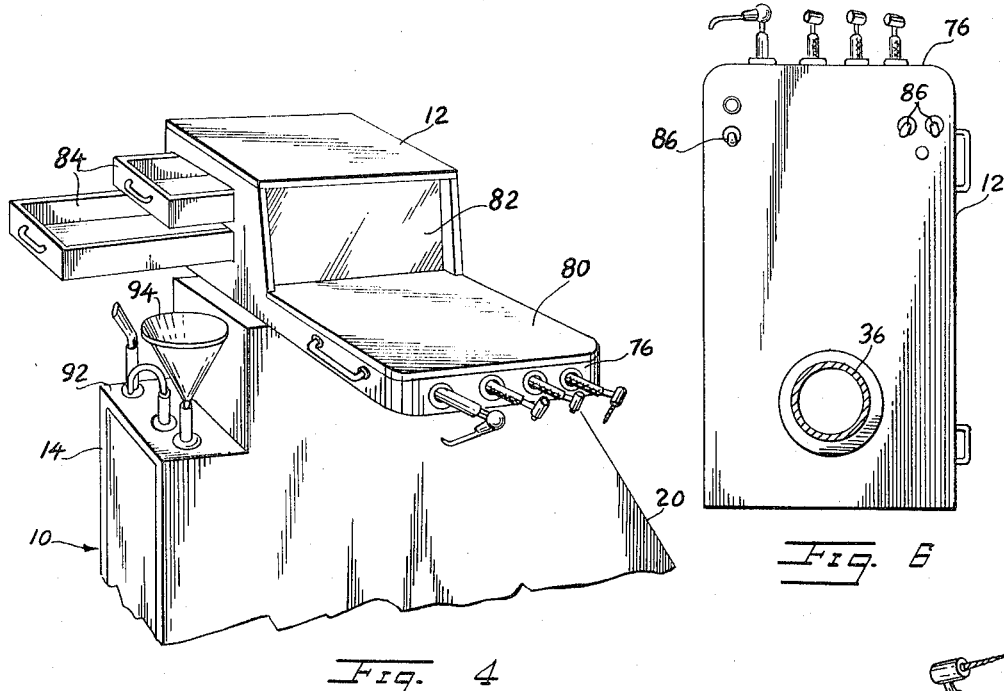
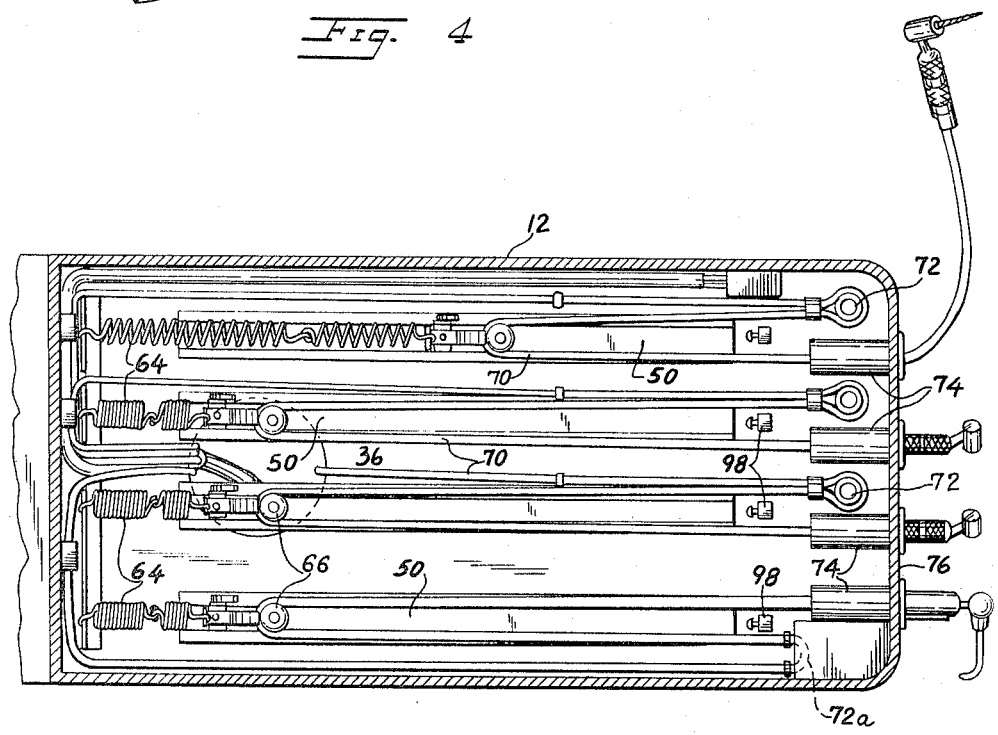
INVENTORS.
NORMAN HOROWITZ
PHILIP SPIGNER
BY
*Samuel J. Stoll*
ATTORNEY

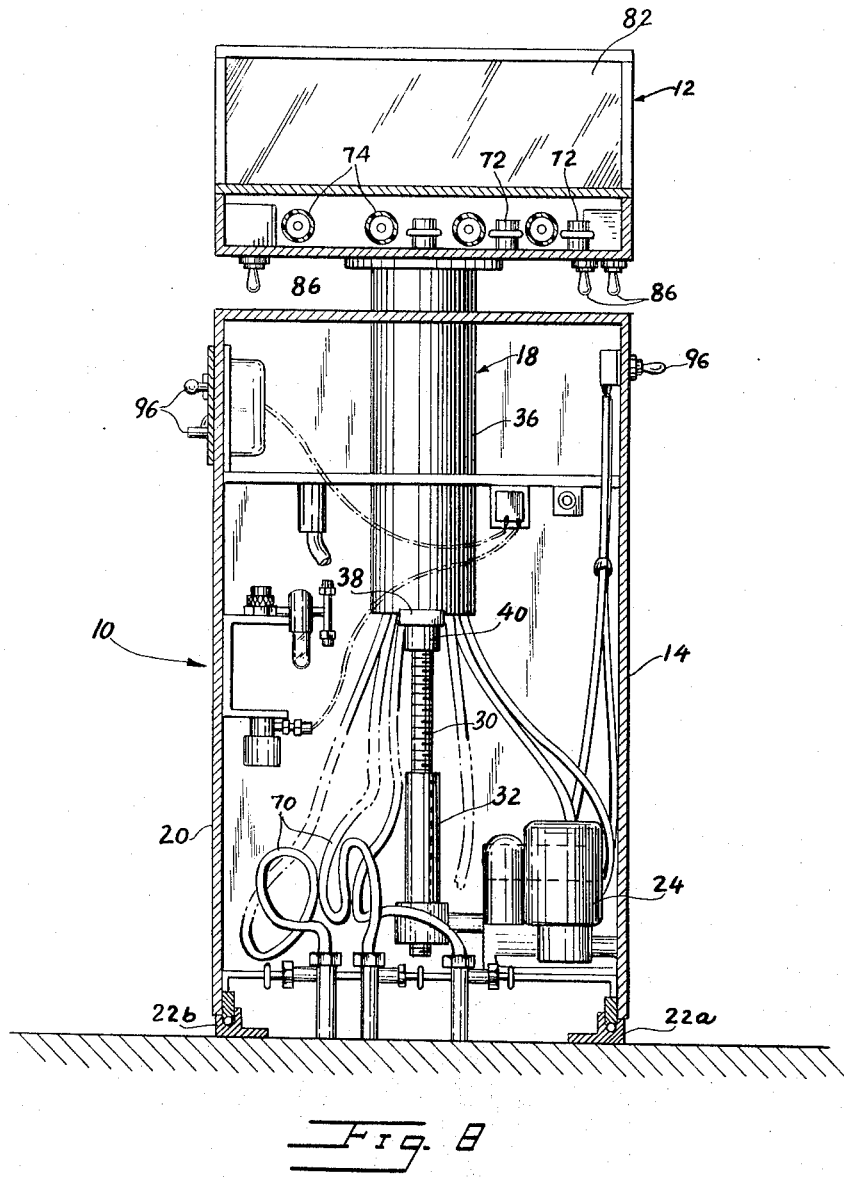

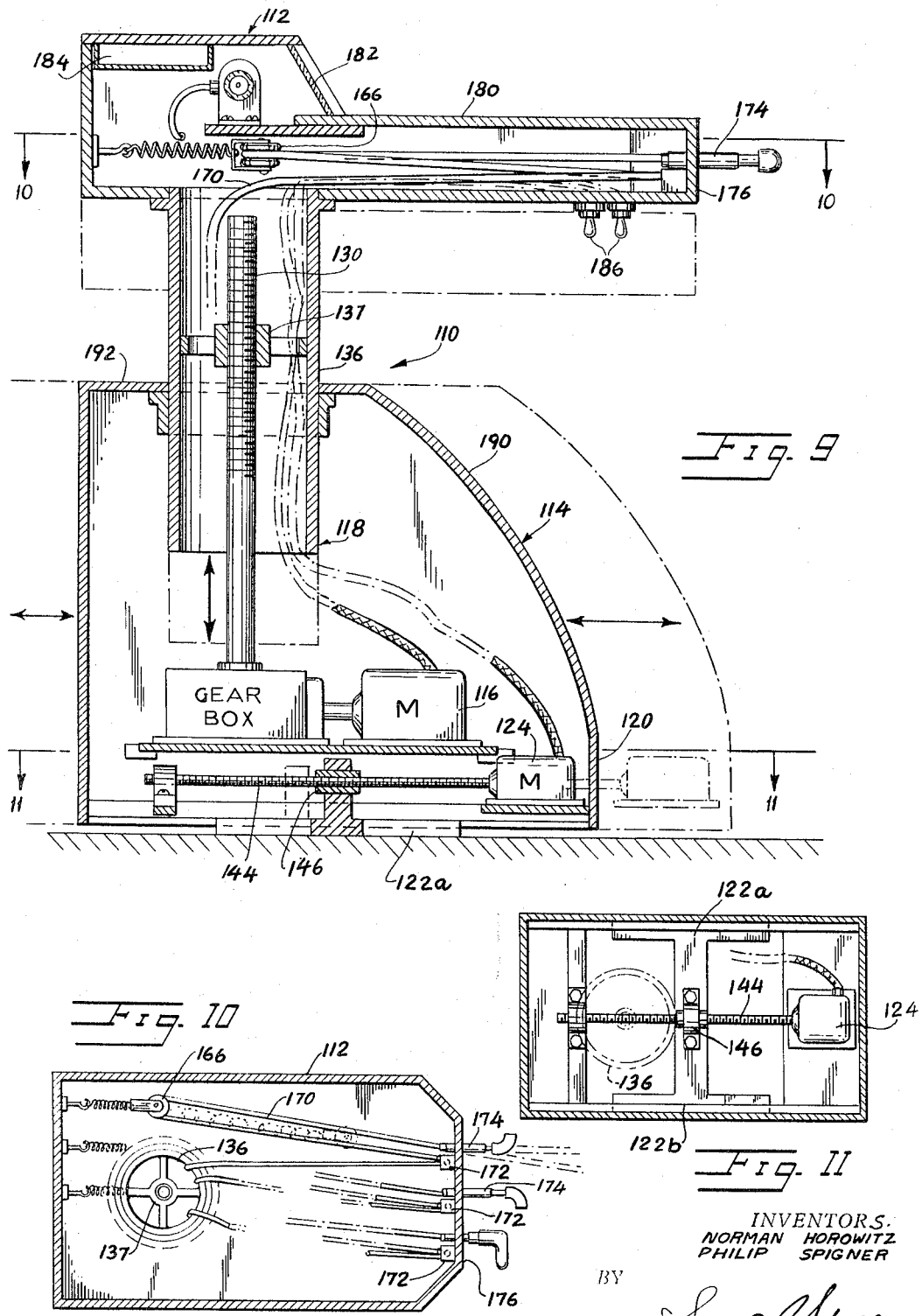

United States Patent Office 3,304,609
Patented Feb. 21, 1967

3,304,609
DENTAL EQUIPMENT STAND
Norman Horowitz, 111—21 77th Road, Forest Hills, N.Y. 11375, and Philip Spigner, 1460 Park St., Atlantic Beach, N.Y. 11509
Filed Feb. 16, 1966, Ser. No. 527,859
8 Claims. (Cl. 32—22)

This application is a continuation-in-part of our copending application, Serial Number 222,127, filed September 7, 1962, now Patent No. 3,271,859, and relates to a dental unit for dental equipment.

Dental office practices and procedures have undergone many changes in recent years. The introduction of many new tools and instruments such as high speed air driven drills and accessories have made former practices and procedures difficult if not impossible. Introduction of other types of dental implements may be expected as dental technology further expands and develops; other dental office practices and procedures are fully expected to follow.

Examples of such changes in practice and procedure are as follows: Formerly the dentist, using the older overhead pulley and shaft driven drills and accessories, stood over the patient, the latter being seated in a more or less reclining position in the dental chair. A small sink basin with constantly flowing flush water would be mounted on a fixed support adjacent the dental chair. When the patient expectorated, he was required to sit up, lean over the side of the dental chair so as to be over the sink basin and to proceed to rinse his mouth in this ungainly position. That this is not satisfactory is made even more apparent when the difficulties of small children, who may be unable to reach the sink basin, and of elderly persons, who find that raising themselves from the dental chair and contorting themselves sideways might be painful if not impossible, are realized.

Formerly, also, the cumbersome nature and complexity of the dental equipment stand or housing, which generally included a plurality of swinging arms, belts, pulleys and shafts with dental tools operably fastened at the ends thereof, necessitated that it be permanently mounted in one position adjacent the dental chair. Obviously this is not convenient for all positions of the dentist, for all positions of the dental chair and for all sizes of patients. It has additionally been noted that the unsightly appearance of such conventional equipment stand, tools and appurtenances has a disturbing effect upon certain patients, especially those of tender years. The new practice and procedure is to allow the patient to recline to any inclination desired by the dentist from the vertical to more than 90° removed from the vertical (below the horizontal) dependent upon the preferences of the dentist and the operative procedures entailed, to have the dentist seated or standing adjacent the dental chair dependent upon the same preferences and procedures and to use extendable implements and tools of all kinds, including waste disposal implements. Such new practices and procedures are made possible by the present invention as can be seen by the objects and description thereof.

It is a cardinal object of this invention, therefore, to provide a universally acceptable equipment stand, housing or unit for medical work, such as the practice of dentistry.

It is another primary object of the invention described herein to provide a dental equipment stand, housing or unit that may be manually or automatically moved to a convenient position for the dental practitioner.

Another object of the instant invention is the provision of an equipment stand, housing or unit for a dental office that will be more pleasing to the eye and that will avoid any undesirable mental images.

A further object and accomplishment hereof is the provision of a dental equipment stand or unit that will be efficient, durable and easy to repair, while being economical to produce.

Still another object hereof is to provide a dental unit which utilizes existing permanent central sources of power, pressure, vacuum, water and the like such that a plurality of such units, situated in adjacent rooms, for example, can make common use of such central sources. Additionally, it is an objective hereof to provide a dental unit which utilizes existing plumbing and wiring connections including connection valves and junction boxes and which conceals such connection valves and junction boxes so as to provide a finished, professional appearance both to the dental office in general and the dental unit in particular.

A still further object of the present invention is to provide a dental unit which places the implements and tools of the dental profession at a position which is most advantageous and comfortable for the dentist and which permits the dentist to sit or stand, at his pleasure, while working with the patient.

Another further object of the present invention is to provide a dental unit which is so movable and positionable as to place the implements and tools of the dental profession at the same relative position with respect to and distance from the mouths of patients regardless of the height of the patient, his position in the dental chair or the position of the dental chair itself.

The present invention has as an additional object the elimination of the impracticable, cumbersome and nonfunctional permanent equipment stanchion with its appurtenances such as the sink basin and constantly flowing water flush, the dangling air hoses and protruding vacuum tubes and the controls, dials and switches which are not movable to a convenient position with respect to dentist and patient.

Other further and additional objects of the present invention will be readily apparent from the description and drawing, it being understood that changes in shape, size, finish or other details may be resorted to without departing from the broad scope of the claims or the broad spirit of the invention.

The present invention generally provides a dental equipment unit comprising a base and a head mounted on the base, said head being movable to whatever position may be required by the dentist. The head, which contains many of the dental operating tools and equipment, is shown to have three vectors of motion—vertical, rotational and horizontal—which are functionally independent; that is, any such vector may be used with or without either of the other two such vectors. For example, use of the vertical vector alone yields a vertical displacement of the head. Use of the vertical vector and the horizontal vector simultaneously yields as a resultant an inclined displacement of the head. Use of the rotational vector alone yields an angular displacemnet of the head. Use of the vertical vector and the rotational vector simultaneously yields as a resultant a helical displacement of the head. Controls for the motion functions may be situated adjacent each other to allow complete and simple flexibility in the choice and use of the three vectors of motion. The base is shown to provide the horizontal vector of motion to the head, but this is a matter of choice of design and it is entirely feasible to have the base fixed in stationary position and to have the head move in all three vectors of motion relative to the base. Conversely, it is also feasible to have the head fixed in relation to the base and have both head and base move as a unit in the three vectors of motion. The base is shown to provide the horizontal vector of motion to the head, but this is a matter of choice of design and it is entirely feasible to have the base fixed in stationary position and to have the head move in all three vectors of motion relative to the base. Conversely, it is also feasible to have the head fixed in relation to the base and have both head and base move as a unit in the three vectors of motion. Many other such combinations are also feasible and within the teaching hereof. Furthermore, there is flexibility in the choice of motion vectors. Thus, while there is a single horizontal vector shown in the embodiments described herein, it is entirely possible and feasible to have two horizontal vectors of motion, perhaps perpendicular to each other. Although the three vectors of motion shown and three orthogonal vectors of motion each provide complete freedom of movement of the head and positioning thereof, it may be desirable in some instances to provide either more or less than three vectors of motion without departing from the teachings, spirit or scope of the invention.

In the drawing:

FIGURE 3 is a cross-sectional view of the present invention as taken across line 3—3 of FIGURE 2 and additionally showing in phantom outline the present invention moved horizontally to the right and the head portion thereof moved upwardly.

FIGURE 4 is a partial pictorial representation of the present invention showing the head portion in an operative position; that is, rotated approximately 90° from the base portion.

FIGURE 5 is a cross-sectional view of the head portion of the present invention as taken across line 5—5 of FIGURE 3 and additionally showing the location of the vertical column in phantom outline and one of the dental tools in extended position.

FIGURE 6 is a cross-sectional view of the vertical column and the underside of the head portion as taken across line 6—6 of FIGURE 1.

FIGURE 7 is a pictorial representation of one of the tracks in the head portion, partially broken away to show the construction thereof.

FIGURE 8 is a partial cross-sectional view of the present invention as taken across line 8—8 of FIGURE 3 showing in phantom the various conduit, tube and power connections.

FIGURE 9 is a side cross-sectional view of an alternative form of the present invention showing additionally in phantom outline horizontal movement of the base portion, vertical movement of the head portion and conduit, tube and power connections.

FIGURE 10 is a partial cross-sectional view of the head portion of the alternative form of the present invention as taken across line 10—10 of FIGURE 9 showing additionally in phantom one of the pulley assemblies in an extended position.

FIGURE 11 is a cross-sectional view of the lower portion of the alternative form of the present invention as taken across line 11—11 of FIGURE 9.

Figures 1, 2:
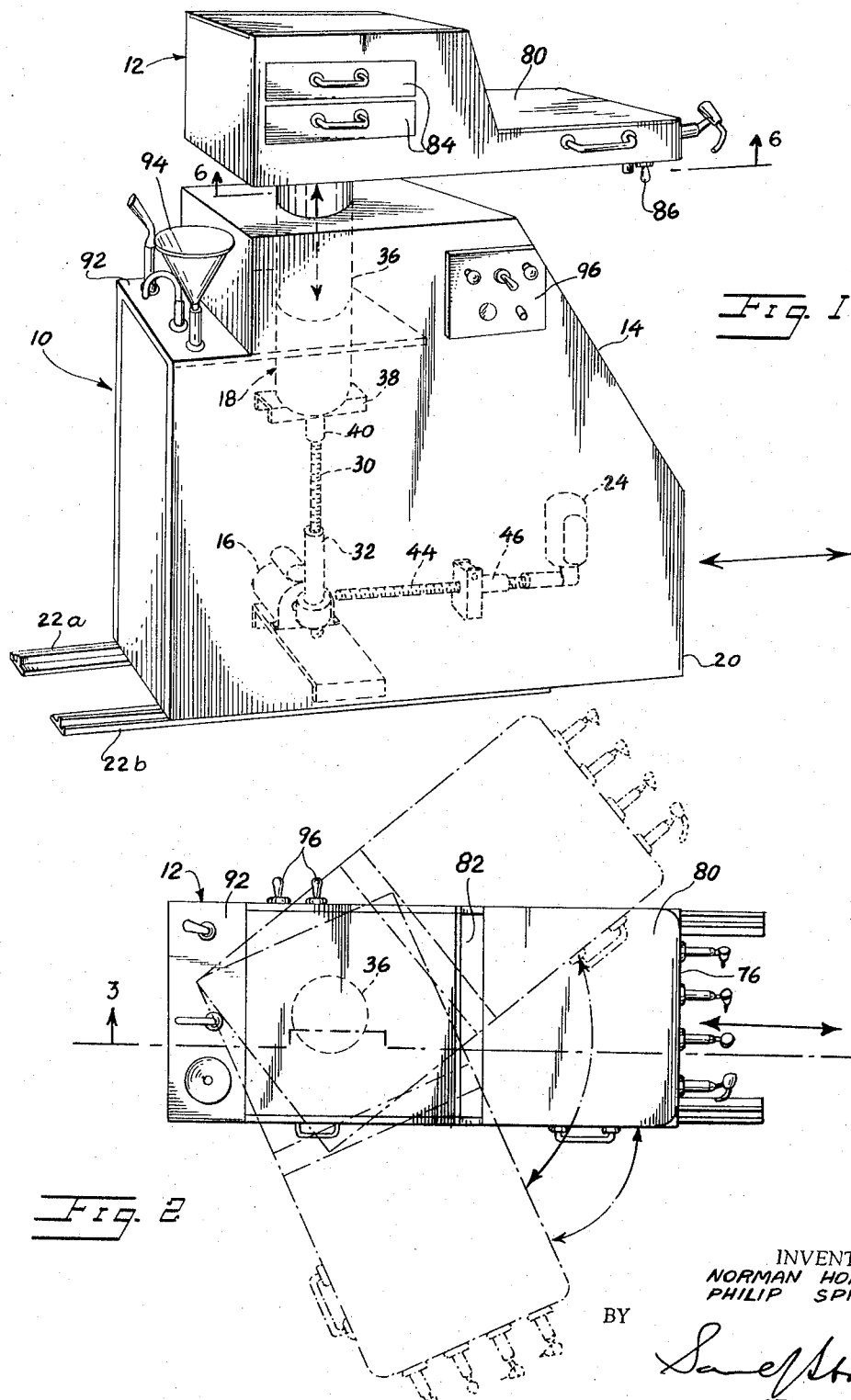
FIGURE 1 is a pictorial representation of the present invention showing in phantom the drive mechanisms for horizontal movement of the entire unit and vertical movement of the head portion.
FIGURE 2 is a top view of the present invention showing in phantom two rotated positions of the head portion.

Referring to the drawing, dental unit 10 has an instrument head 12 adjustably supported by mounting means 14. Mounting means 14 includes a motor 16 vertically driving elevator means 18 which is affixed to, supports and controls the vertical position of instrument head 12. Mounting means 14 further includes a floor mounted support or enclosure 20 horizontally driven by a motor 24 and a pair of parallel floor mounted tracks 22a and 22b upon which support 20 rests and by which support 20 is guided in its horizontal movement.

Elevator means 18 is shown to be comprised of a vertical threaded shaft 30 riding vertically in threaded engagement with a threaded collar 32, said vertical threaded shaft 30 being axially rotated by motor 16 and connective gearing of common variety. A cylindrical column 36 is vertically disposed above and in coaxial alignment with vertical threaded shaft 30. Column 36 is supported and positioned vertically by vertical threaded shaft 30, there being a structural cross-member 38 and an end bearing 40 between column 36 and vertical threaded shaft 30 to provide load bearing support. End bearing 40 is not threaded and hence column 36 and vertical threaded shaft 30 are free to axially rotate with respect to each other, the axial rotation of either said column 36 or said vertical threaded shaft 30 not causing axial rotation of the other of said members.

Motor 24 is mounted on support 20 and axially rotates, by gearing of common variety, a horizontal threaded shaft 44. A threaded collar 46 is immovably secured to the floor and is in threaded engagement with horizontal threaded shaft 44.

Instrument head 12 is secured to and is supported by column 36. Within instrument head 12 are a plurality of parallel pulley tracks 50. Four such pulley tracks are shown in FIGURE 5 by way of illustration, and a detailed view is provided in FIGURE 7. They have been omitted from FIGURE 8 for clarity. Pulley track 50 is shown to have a generally oval shape in cross-section and a longitudinally extending opening in its uppermost portion thereby forming two longitudinal upper rails 52a and 52b. One of such upper rails 52a is provided with a series of notches 54 each of which is provided with a vertical sear on its front side, front to be defined hereinbelow. A sliding plate 60 rides within track 50. Mounted upon sliding plate 60 above upper rail 52a in alignment with notches 54 is a swinging pawl 62 positioned such that when it is in a vertical position it extends below said upper rail 52a. Therefore, when pawl 62 is at other positions along upper rail 52a, it cannot hang vertically but must assume a position away from the vertical as shown in FIGURE 7. A tension spring 64 tends to draw sliding plate 60 to the rear of track 50. A freely rotatable pulley 66 is mounted on sliding plate 60. Before the series of notches 54 with associated sears begins, at the front portion of upper rail 52a and in alignment with said series of notches 54 is a notch 68 having no sear associated therewith.

Instrument head 12 further includes a selection of the dental implements and tools used by the dentist such as drills, polishing and grinding wheels, air and water sprays and the like. Associated with each such implement is one pulley track 50 as above described. A conduit 70 of a type appropriate for the tool with which it is associated extends from support 20 up through column 36 into instrument head 12. Within instrument head 12, each conduit 70, there being one conduit for each implement or tool in said instrument head 12, extends from column 36 to the front of the instrument head where it is secured to a post 72 or some other element permitting a 180° reversal of conduit 70 such as a U-shaped tube 72a. Conduit 70 then extends toward the rear of instrument head 12 substantially parallel to track 50 to pulley 66, wraps around pulley 66 and extends to the front of instrument head 12 where it is connected via a socket 74 in the front wall 76 to the implement or tool it serves. The front portions of tracks 50 are those portions thereof which are closest to front wall 76.

Instrument head 12 also is shown to include an instrument tray 80, a viewing screen 82 which is illuminated from behind and two drawers 84. Control switches 86 for operating the various electrical systems such as motor 16, motor 24, illumination for screen 82 and the electrically powered dental tools and implements.

Floor mounted support 20 is shown to include an inclined front panel 90 and a rear shelf 92. Resting on rear shelf 92 are various additional implements of the dental profession such as a suction mouthpiece for keeping the patient's mouth relatively saliva-free and a source of water. Another implement mounted on rear shelf 92 is a conical receptacle 94 connected to a waste disposal system which is used in place of the sink basin formerly used. These implements are connected by appropriate conduits to the various vacuum, power or waste receptacle sources. Support 20 additionally has control switches 96 for controlling various functions such as the main power supply, etc.

The operation of dental unit 10 is generally as follows:

Tracks 22a and 22b are positioned adjacent and substantially parallel to a dental chair of an adjustable, reclining type. The patient seated in the chair and the chair itself are positioned as required by the dentist, generally fully reclining. Instrument head 12 is rotated by hand about the axis of column 36 and vertical threaded shaft 30 over the patient. By manipulating control switches 86 the entire dental unit 10 is moved horizontally on tracks 22a and 22b by means of motor 24 driving horizontal threaded shaft 44, and instrument head 12 is moved vertically on column 36 by means of motor 16 driving vertical threaded shaft 30 until the tools and implements of said instrument head 12 are precisely positioned with respect to the patient's mouth as determined by the dentist having regard for the dental function to be utilized. Instantaneous and, within extreme limits, infinite adjustments to such position are readily made. The tools and implements are used by simply pulling them out to the desired extent. By so extending a tool or implement, conduit 70 associated therewith is also extended, drawing with it pulley 66 and sliding plate 60 along track 50. As pawl 62 passes over the rearmost notch 54 and the sear associated therewith it is rotated rearwardly so as to be inclined towards the rear of track 50. When the implement is extended as far as desired it is released. Spring 64 pulls sliding plate 60 back until pawl 62 engages a vertical sear and thereby prevents further rearward movement of sliding plate 60. When it is desired to replace the implement in its socket 74, the implement is first pulled out all the way, that is, until sliding plate 60 is prevented from further travel by a stop 98. The implement is released and spring 64 draws sliding plate 60 rearwardly. Pawl 62 passes into first notch 68 and is rotated so as to be inclined frontwardly as shown in FIGURE 7. As sliding plate 60 continues to the rear on track 50, pawl 62, being inclined in the trailing direction, does not engage any vertical sears and therefore the implement is withdrawn into its socket 74.

An alternative form of the present invention is shown in FIGURES 9, 10 and 11. Dental unit 110 has an instrument head 112 adjustably supported by mounting means 114. Mounting means 114 includes a motor 116 vertically driving elevator means 118 which is affixed to, supports and controls the vertical position of instrument head 112. Mounting means 114 further includes a floor mounted support or enclosure 120 horizontally driven by a motor 124 and a pair of parallel floor mounted tracks 122a and 122b upon which support 120 rests and by which support 120 is guided in its horizontal movement.

Elevator means 118 is shown to be comprised of a vertical threaded shaft 130 which is axially rotated by motor 116 and connecting gearing of common variety. A cylindrical column 136 is co-axially disposed about vertical threaded shaft 130. Column 136 has a centrally located threaded collar 137 which is in threaded engagement with vertical threaded shaft 136.

Motor 124 is mounted on support 120 and axially rotates a horizontal threaded shaft 144. A threaded collar 146 is immovably secured to floor mounted tracks 122a and 122b and is in threaded engagement with horizontal threaded shaft 144.

Instrument head 112 is secured to and is supported by column 136. Within instrument head 112 are a plurality of spring mounted pulleys 166. Only one such pulley 166 is shown in FIGURE 10 for clarity. Instrument head 112 further includes a selection of the dental implements and tools used by the dentist such as drills, polishing and grinding wheels, air and water sprays and the like. Associated with each such implement is one spring mounted pulley 166. A conduit 170 of a type appropriate for the tool with which it is associated extends from support 120 up through column 136 into instrument head 112. Within instrument head 112 each conduit 170, there being one conduit for each implement or tool in said instrument head 112, extends from column 136 to the front of the instrument head where it is secured to a post 172 or some other element permitting a 180° reversal of conduit 170 such as a U-shaped tube or the like. Conduit 170 then extends toward the rear of instrument head 112 to spring mounted pulley 166, wraps around said pulley 166 and extends to the front of instrument head 112 where it is connected via a socket 174 in the front wall 176 to the implement or tool it serves.

Instrument head 112 also is shown to include an instrument tray 180, a viewing screen 182 which is illustrated from behind and a drawer 184. Control switches 186 for operating the various electrical systems such as motor 116, motor 124, illumination for screen 182 and the electrically powered dental tools and implements.

Floor mounted support 120 is shown to include a convex inclined front panel 190 and a rear shelf 192 usable for placement of various additional tools and implements. Support 120 may be provided with additional control switches and accessories.

The operation of dental unit 110 is generally similar to that of dental unit 10 as above described. The tools and implements in instrument head 112 are simply pulled out for use and released for replacement in the appropriate socket 174.

With respect to both forms of this invention all connections to sources of electrical power, air pressure, vacuum and waste disposal, and all controls, pipes, wires and valves can be concealed within the floor mounted enclosures or supports. Central supply and disposal units can be utilized for a plurality of dental units.

While the foregoing is illustrative of preferred forms of this invention it will be understood that variations and modifications thereof are contemplated and may be utilized within the broad principles of the invention and the broad scope of the claims.

What is claimed is:

1. A dental unit adapted for use adjacent a dental chair and comprising an instrument head having electrically powered instrument means and air and water appliances, and mounting means adjustably supporting said instrument head for vertical and rotational movement relative to said mounting means and such dental chair and for horizontal movement relative to such dental chair, said mounting means including motor-driven elevator means for raising and lowering the instrument head relative to said mounting means and to said dental chair, said elevator means including a generally vertical, hollow column, said instrument head being mounted on said hollow column for rotational movement about its longitudinal axis, said mounting means also including a motor-driven horizontally movable floor-mounted support for said hollow column for imparting horizontal movement to said hollow column and instrument head relative to such dental chair.

2. A dental unit in accordance with claim 1, wherein the instrument head includes a manual instrument tray.

3. A dental unit in accordance with claim 1, wherein floor tracks are provided for the floor-mounted support to guide it in a linear path relative to such dental chair.

4. A dental unit in accordance with claim 1, wherein the mounting means adjustably supports the instrument head for concurrent vertical and horizontal movement relative to such dental chair, thereby effecting as a resultant an inclined movement of the instrument head combining the vertical and horizontal vectors of motion.

5. A dental unit in accordance with claim 1, wherein the mounting means adjustably supports said instrument head for concurrent vertical and rotational movement relative to such dental chair, thereby effecting as a resultant a generally helical movement of the instrument head combining the vertical and rotational vectors of motion.

6. A dental unit in accordance with claim 1, wherein the mounting means adjustably supports said instrument head for concurrent vertical, horizontal and rotational movement relative to such dental chair, thereby effecting as a resultant a movement of the instrument head combining the vertical, horizontal and rotational vectors of motion.

7. A dental unit in accordance with claim 8, wherein flexible air and water hoses and electrical conductors project upwardly from the floor into the floor-mounted support, through the hollow column, and into the instrument head where they are connected respectively by way of said pulleys to the air and water appliances and electrically powered instrument means, said appliances and instrument means each being individually extendable and retractable with the pulley associated therewith.

8. A dental unit in accordance with claim 1, wherein said instrument head comprises:
a plurality of parallel tracks;
a plurality of sears and notches, a sequence of sears and notches being provided adjacent each of said tracks;
a plurality of spring retractable pulleys, one pulley being provided for each of said tracks and being movable and retractable therealong; and
a plurality of pawls, one pawl being associated and movable with each of said pulleys, each of said pawls being engageable by a sear to prevent retraction of the pulley associated with such pawl and being disengageable by a notch to permit retraction thereof.

References Cited by the Examiner
UNITED STATES PATENTS

| | | | |
|---|---|---|---|
| 2,065,952 | 12/1936 | Trautmann | 108—147 X |
| 3,085,338 | 4/1963 | Patzold et al. | 32—22 |
| 3,111,759 | 11/1963 | Shackelford | 32—22 |
| 3,210,846 | 10/1965 | Balkin | 32—22 |

RICHARD A. GAUDET, *Primary Examiner.*

ROBERT E. MORGAN, *Examiner.*